US011729254B2

(12) United States Patent
Kupisiewicz et al.

(10) Patent No.: US 11,729,254 B2
(45) Date of Patent: *Aug. 15, 2023

(54) PATTERNLESS PROMPT DETECTION OF COMMAND COMPLETION

(71) Applicant: Cisco Technology, Inc., San Jose, CA (US)

(72) Inventors: Piotr Jerzy Kupisiewicz, Cracow (PL); Jonathan Maria Jan Slenders, Ghent (BE); Frédéric René Philippe Detienne, Harze (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,480

(22) Filed: Apr. 11, 2022

(65) Prior Publication Data

US 2022/0263887 A1  Aug. 18, 2022

Related U.S. Application Data

(63) Continuation of application No. 17/224,455, filed on Apr. 7, 2021, now Pat. No. 11,349,907.

(60) Provisional application No. 63/150,307, filed on Feb. 17, 2021.

(51) Int. Cl.
*H04L 67/08* (2022.01)
*H04L 43/12* (2022.01)

(52) U.S. Cl.
CPC .............. *H04L 67/08* (2013.01); *H04L 43/12* (2013.01)

(58) Field of Classification Search
CPC ................................ H04L 67/08; H04L 43/12

USPC ......................................................... 709/206
See application file for complete search history.

(56) References Cited

U.S. PATENT DOCUMENTS

| 6,721,808 | B1 | 4/2004 | Singh |
| 8,209,356 | B1 | 6/2012 | Roesler |
| 2003/0191590 | A1 | 10/2003 | Narayan et al. |
| 2008/0005286 | A1 | 1/2008 | Short et al. |
| 2008/0313309 | A1 | 12/2008 | Banerjee |
| 2009/0064142 | A1 | 3/2009 | Kajita |
| 2010/0217849 | A1 | 8/2010 | LaForest |
| 2011/0093619 | A1 | 4/2011 | Nelson |

(Continued)

FOREIGN PATENT DOCUMENTS

| CN | 106713487 A | 5/2017 |
| WO | 2016078234 A1 | 5/2016 |

OTHER PUBLICATIONS

Dask, "Source code for distributed.deploy.ssh", retrieved Aug. 18, 2021, 7 pages; https://docs.dask.org/en/stable/_modules/distributed/deploy/ssh.html.

(Continued)

*Primary Examiner* — James E Springer
(74) *Attorney, Agent, or Firm* — Edell, Shapiro & Finnan, LLC

(57) ABSTRACT

Methods are provided in which a computer device provides, to a network device, an editing probe instruction for a cursor movement on a command line interface for interfacing with the network device. In these methods, the computer device obtains, from the network device, data output and determines whether the network device completed a command output based on whether the data output indicates the cursor movement on the command line interface.

20 Claims, 5 Drawing Sheets

(56) References Cited

U.S. PATENT DOCUMENTS

| | | | |
|---|---|---|---|
| 2012/0005520 A1* | 1/2012 | Ashraff | G06F 8/70 |
| | | | 714/4.11 |
| 2013/0275625 A1 | 10/2013 | Taivalsaari et al. | |
| 2015/0304417 A1 | 10/2015 | Tan | |
| 2016/0112241 A1* | 4/2016 | Kaushik | H04L 41/026 |
| | | | 709/223 |
| 2017/0180474 A1 | 6/2017 | Ding et al. | |
| 2019/0227829 A1 | 7/2019 | Schnee et al. | |
| 2019/0384415 A1 | 12/2019 | Zeinali Zadeh Ranjhbar | |
| 2020/0064929 A1 | 2/2020 | Fan et al. | |
| 2020/0351367 A1 | 11/2020 | Eberlein | |

OTHER PUBLICATIONS

Matthew Freeman et al., "Shell Integration", iTerm2, retrieved from Internet Dec. 28, 2021, 8 pages; https://iterm2.com/3.1/documentation-shell-integration.html.

Jonathan Slenders, "Scrapli prompt-discovery -> patternless prompt detection" Issue #30, carlmontanari/scrapli—Gitbub, Jul. 7, 2020, retrieved from Internet Dec. 28, 2021, 7 pages; https://github.com/carlmontanari/scrapli/issues/30.

NaeiKindus, "Cannot detect prompt if it is truncated" Issue #1023, ktbyers/netmiko—Gitbug, Dec. 4, 2018, retrieved from Internet Dec. 28, 2021, 3 pages; https://github.com/ktbyers/netmiko/issues/1023.

Aleksander Rodionov, "ktbyers/netmiko: Multi-vendor library to simplify Paramiko SSH connections to network devices", Github, retrieved from Internet Dec. 28, 2021; https://github.com/ktbyers/netmiko/.

Paramiko documentation, "Welcome to Paramiko!", retrieved from Internet Dec. 28, 2021, 1 page; http://www.paramiko.org/.

\* cited by examiner

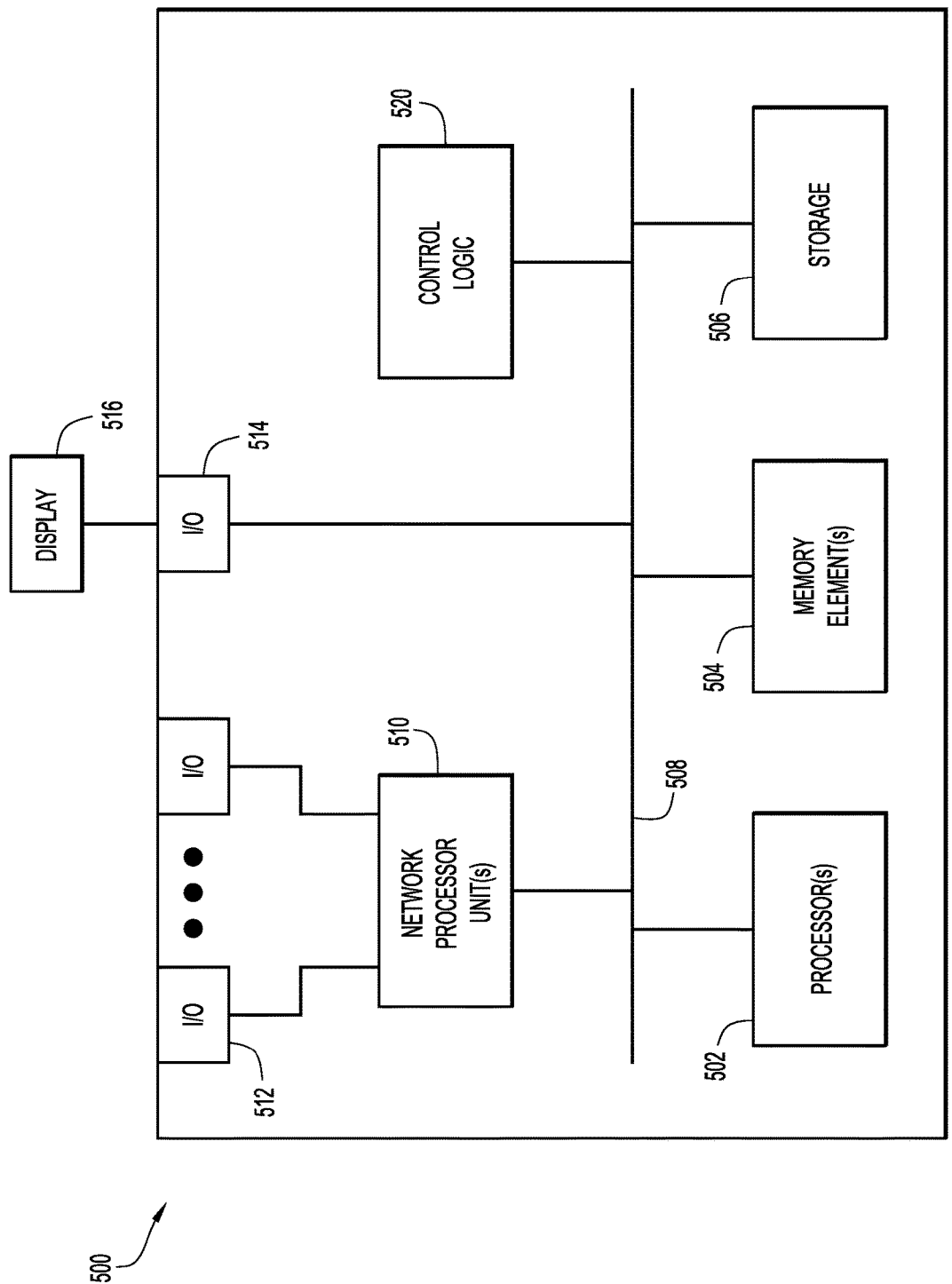

PATTERNLESS PROMPT DETECTION OF COMMAND COMPLETION

CROSS-REFERENCE TO RELATED APPLICATION

This application is a continuation of U.S. patent application Ser. No. 17/224,455, filed Apr. 7, 2021, which claims the benefit of priority under 35 U.S.C. § 119(e) to U.S. Provisional Patent Application Ser. No. 63/150,307, entitled "PATTERNLESS PROMPT DETECTION OF COMMAND COMPLETION," filed on Feb. 17, 2021, which are hereby incorporated by reference in their entireties.

TECHNICAL FIELD

The present disclosure relates to computer networking.

BACKGROUND

Many software systems implement a command line interface (CLI) for control and operation. Typically, a CLI displays a command prompt (prompt), embodied as one or more characters (e.g. ">_") that indicate readiness of the software system to accept commands. A user inputs a command-line argument or parameters (command), serving as an instruction for the software system. The software system executes the command and outputs results (command or data output) onto the CLI. The output may include one or more lines of characters. When a command output is complete, the user detects the prompt and inputs the next command. To execute multiple commands or automate execution of commands, scripting may be used.

BRIEF DESCRIPTION OF THE DRAWINGS

FIG. 5 is a hardware block diagram of a computing device that may perform functions associated with any combination of operations in connection with the techniques depicted and described in FIGS. 1-4, according to various example embodiments.

DESCRIPTION OF EXAMPLE EMBODIMENTS

Overview

Figure 1:
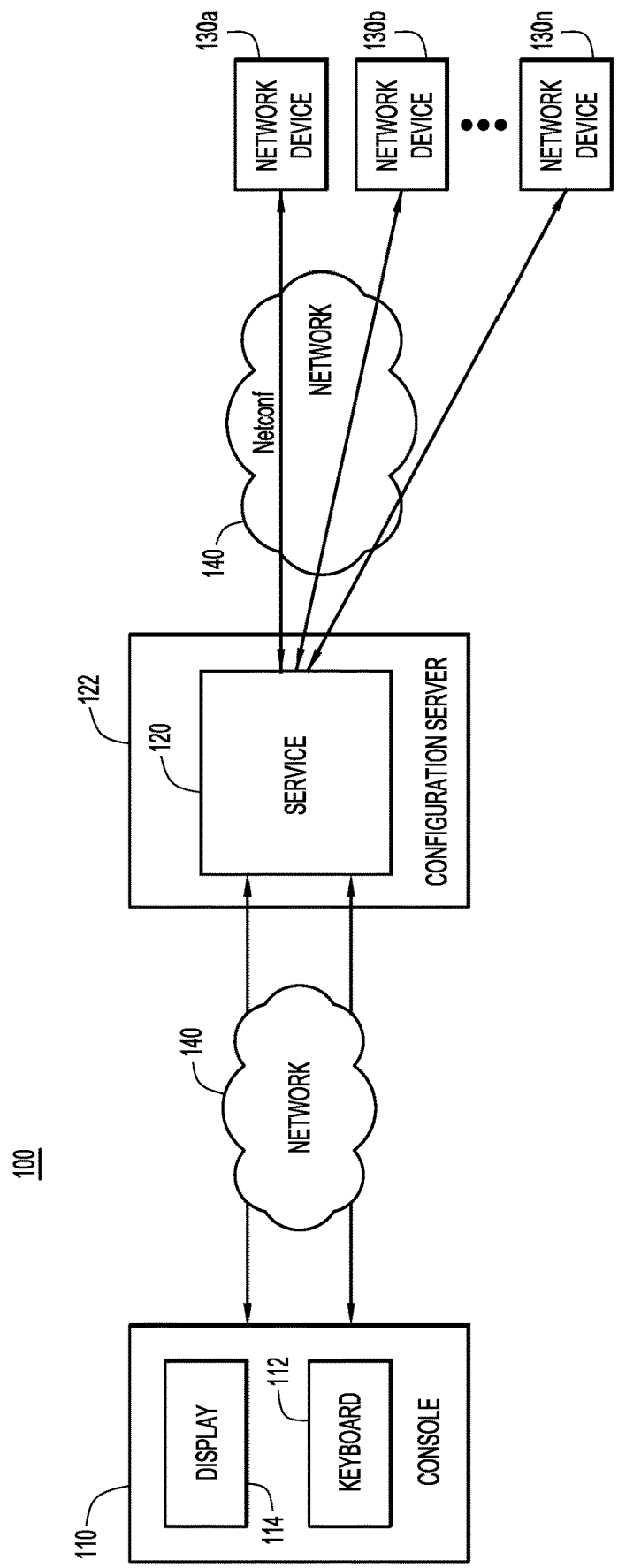
FIG. 1 is a block diagram illustrating a system for detecting command output completion on a command line interface of a network device, according to an example embodiment.

Briefly, methods are presented for patternless prompt detection. In these methods, a completion of command output is detected on a character-based terminal by probing for line-editing functionality, which is only available when a prompt for command input is displayed or is active.

These methods include a computer device providing, to a network device, an editing probe instruction for a cursor movement on a command line interface for interfacing with the network device. These methods further include the computer device obtaining, from the network device, data output and determining whether the network device completed a command output based on whether the data output indicates the cursor movement on the command line interface.

EXAMPLE EMBODIMENTS

The CLI on terminal-based devices, such as network devices that run an operating system (OS), is intended for manual or human consumption. For example, a user detects a prompt, inputs a command, and obtains output of the command. It is easy for the user to visually observe the status of the CLI on the character-based terminal.

Network management and configuration are often performed automatically using scripting. For example, a network operator (a user) may use a console (a client device with a display) to connect to a network device e.g., a switch, a router, a firewall, UNIX machine and/or LINUX machine, using a secure shell (SSH) connection. Using the established SSH connection, the user runs a script in which multiple commands are executed on the network device to diagnose a problem, obtain configuration parameters, telemetry data, configure the network device, and so on. The network operator receives, via the console, output of the commands from the network device. It is difficult, however, to programmatically detect the beginning and ending of the command output. Consider, as an example, the following characters displayed on the CLI of the network device:

Edge1 #show version
OS XE Software, Version 16.12.04
OS Software [Gibraltar], L3 Switch Software (X_IOSXE), Version 16.12.4, RELEASE
SOFTWARE (x5)
Technical Support: http://www.techsupport
Copyright (c) 1986-2020 by Company X.
Compiled Thu 09-Jul-20 21:42 by mcpre
Edge1 #

When the command is executed manually, an operator can visually detect the prompt "Edge1 #" and whether the execution of the command output is still ongoing or has ended. In contrast, it is difficult for a machine to detect the end of the command output. Some solutions rely on regular expressions for prompt detection and timers. For example, if there is no data streaming for two seconds, it is assumed that the command output has finished. These solutions are inefficient and error prone.

Since timers are used to ensure that the command output is completed, fetching command outputs becomes slow. First, the prompt needs to be detected, and second, a timeout is initiated to ensure that there is no more data streaming for the command output. Since, typically, these timers are set to one to two seconds, each command output will take at least one to two seconds. This is excessively slow for scripting. Moreover, these timers may not account for connection interruptions and unusual slowness of the network device, causing further errors.

Moreover, the existing solutions require knowledge of the prompt character(s) that may vary among different systems. As such, the prompt character(s) are hard-coded into the respective solutions for identification. Accordingly, each prompt detection tool is specific to a particular system and is not generic i.e., cannot be applied to multiple, different systems. Also, since the console cannot change the prompt character(s) of the network device, the existing solutions become difficult to use.

Additional errors occur because some prompts are multiline (e.g., Linux operating systems). Existing prompt detection tools crash and cannot detect the end of the command output for the multiline prompt.

Further still, some prompts appear in the actual command output itself and cause errors. For example, a command "show running-config" renders the prompt inside of the command output. Similarly, if the prompt is a single character (e.g., "#"), end of command output is often inaccurately detected.

Techniques presented herein propose a generic solution for detecting a completion of command output based on probing for line-editing functionality. Line-editing functionality allows one or more cursor movements and text editing of a command input. Line-editing functionality is available only when the prompt is active i.e., when the character-based terminal is ready for command input. Accordingly, techniques detect that the command output is complete based on the line-editing functionality being enabled on the CLI of the character-based terminal.

FIG. 1 is a block diagram depicting a system 100 for detecting command output completion on a command line interface of a network device, according to an example embodiment. The system 100 includes a number of entities and one or more networks 140. The entities include at least a console 110, a service 120 running on a server, such as a configuration server 122, and network devices 130a-n. The notation "a-n" denotes that a number is not limited, can vary widely, and depends on a particular use case scenario.

The entities (nodes, network devices, computing devices, etc.) of the system 100 communicate via the one or more networks 140. The one or more networks 140 may include a local area network (LAN), a wide area network (WAN) such as the Internet, or a combination thereof, and includes wired, wireless, or fiber optic connections. In general, the one or more networks 140 can use any combination of connections and protocols that support communications between the entities of the system 100.

In various example embodiments, the entities of the system 100 (the console 110, the configuration server 122, and the network devices 130a-n) may each include a network interface, at least one processor, and a memory. Each entity may be any programmable electronic device capable of executing computer readable program instructions. The network interface may include one or more network interface cards that enable components of the entity to send and receive data over the one or more networks 140. Each entity may include internal and external hardware components such as those depicted and described in further detail in FIG. 5.

The console 110 is a computer device or a client device. The console 110 includes a user interface (e.g., a keyboard 112) configured to obtain command input from an operator and configured to provide command output to the operator (e.g., via a display 114). The console 110 communicates with and configures one or more of the network devices 130a-n, via the service 120, using an SSH connection, for example. The console 110 requests data and/or action(s) from the network devices 130a-n by providing commands and obtaining data or results from these network devices 130a-n as command output.

The console 110 may generate a script or a playbook, which is an automated process for deploying the method of procedure (e.g., executing, on specific devices, the operations to configure or obtain various data such as configuration parameters, telemetry data, and so on from the specific devices).

The service 120 may optionally include a database. The configuration server 122 may be a controller that configures and manages the network devices 130a-n. The service 120 running on the configuration server 122 may include one or more modules or units to perform various functions of the embodiments described below. The service 120 may be implemented by any combination of any quantity of software (and/or hardware modules or units), and may reside within memory of the configuration server 122 for execution by a processor.

The service 120 may enable a user, such as a network operator, to add, remove, and edit methods or procedures, which include operations that can be executed on the network devices 130a-n to perform maintenance, change configurations, gather telemetry data, or troubleshoot. The service 120 via the configuration server 122 may transmit operations to the network devices 130a-n for execution and may obtain information about the network devices 130a-n. When the service 120 receives instructions from an operator (e.g., via the console 110), the instructions (commands) may be transmitted to one or more devices (e.g., network devices 130a-n) and executed locally on these network devices 130a-n. The results or output of the instructions (called command output) are then provided to the console 110 via the service 120.

While only one service 120 is depicted in FIG. 1, the number of the services may depend on a particular configuration of the system 100. For example, there may be multiple services (multiple configuration servers or network controllers), each connected to a respective set of the network devices 130a-n. According to one or more example embodiments, the console 110 and the service 120 may be integrated into a single computing device such as the configuration server 122 or a network controller.

The network devices 130a-n may include line cards or stand-alone instances of one or more of switches, routers, gateways, repeaters, access points, traffic classifiers, firewalls, intrusion detectors, and the like.

Figure 2:
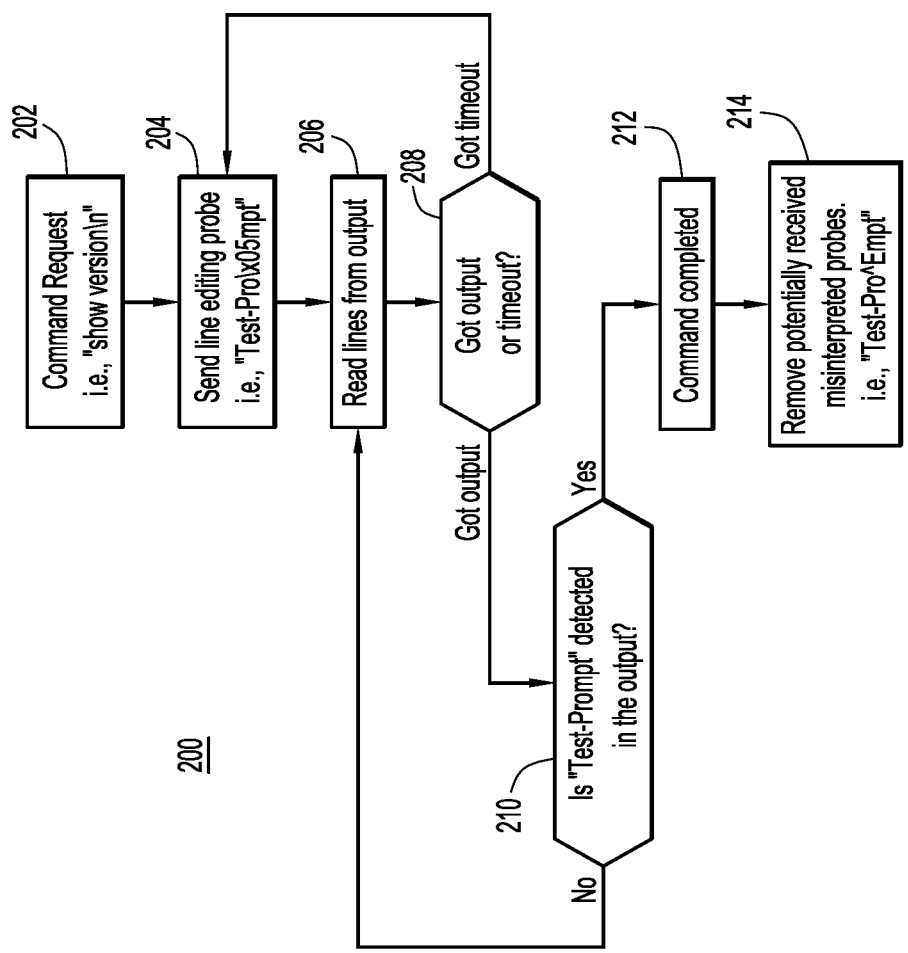
FIG. 2 is a flow diagram illustrating a method for detecting command output completion on a command line interface of a network device, according to an example embodiment.

Reference is now made to FIG. 2, which is a flow diagram illustrating a method 200 of detecting a completion of command output, according to an example embodiment. The method 200 may be implemented by a computer device such as the console 110 of FIG. 1.

At 202, the device receives a command request, which includes one or more commands. The command request may be from a script intended to be executed by one or more network devices 130a-n. As an example, the device obtains, from an operator, the command request to show a version of an operating system running on a respective network device of the network devices 130a-n (e.g., "show version\n"). The command request is provided to the respective network device via the service 120 such that "show version" and enter key is input at a CLI prompt "edge #1" of the respective network device.

At 204, the device sends a line editing probe instruction to the respective network device to determine if the command output is complete. The input line editing probe instruction behaves differently at the respective network device depending on whether line-editing is active (whether the prompt is active). For example, the line-editing probe instruction is "Test-Pro\x05mpt". The "x05mpt" corresponds to a "CTRL E" key press, which is a command to move the cursor to the end of the input line.

At 206, the device determines if output is received from the network device (via the service 120). If output is received, the method 200 proceeds to operation 210. On the other hand, if output is not received, the device continues to wait for output until a probe timeout is reached. If the probe timeout is reached ("Got timeout"), the method 200 returns to the operation 204 in which another line editing probe instruction is provided to the network device. The probe timeout is set to any arbitrary value and does not affect the correctness of the method 200. If the probe timeout is short, the line editing probe instructions are provided more often. If the probe timeout is longer, there is a chance of a short delay at the very end of the method 200. In a given example, the probe timeout is set to be approximately one second.

This probe timeout is different from timeouts of the existing solutions described above. Values of the timeouts in existing solutions are typically longer and the operator cannot distinguish between "output being complete" and "the server is processing the command, output will follow later". In an example embodiment, the probe timeout is only used to probe again to determine when the line-editing functionality becomes available, thereby indicating that the command output is completed.

At 210, the device analyzes the data output received from the respective network device. Lines of the data output are read and analyzed to determine whether the line editing functionality was performed at the network device. For example, the device detects the "Test-Prompt" (e.g., "Test-Pro^Empt") in the received data output. If the "Test-Prompt" is not detected, the method 200 returns to 206 to read the next line or lines of data output. If the "Test-Prompt" is detected indicating that the line editing function CTRL E key press was performed, the method 200 then proceeds to operation 212.

At 212, the device determines that command output is complete and the network device is ready for the next command request. In short, the prompt being active is detected. At 214, the received test prompt(s) (e.g., "Test-Pro^Empt") are deleted from the command output to avoid confusing the operator with unrelated data therein.

Some network devices may provide an indication in the data output that the editing probe instruction was executed differently from example embodiments described above. For example, the data output does not include "Test-Prompt" but rather includes "Test-Pro\b \b\b\b\b\bTest-Prompt" or "Test-Pro\r\x1b[KTest-Prompt" in the data output. For these types of network devices, the output data (obtained via an output channel) is passed through a terminal emulator (e.g., video terminal "VT100" interpreter) to interpret cursor movements on the CLI of the network device. For example, when a cursor forward movement as "\x1b[C" is received, the cursor needs to be moved in the output stream. Output data is then parsed by a terminal emulator code of the service 120 to obtain the proper interpretation of cursor movements regardless of the line editing library that was used on the remote side.

That is, data output from a network device is usually consumed by a human through a terminal emulator, which is a program that emulates the behavior of a terminal. This terminal takes as input the data that it receives from a remote network device and performs data interpretation. Plain text is displayed in the terminal, while special characters such as "\x1b[C" indicate an instruction for the terminal to perform a cursor movement. Accordingly, when a user want to perform machine interaction through the same communication channel, the user needs to interpret these escape sequences similar to a terminal or a terminal emulator. If the received output is stored as a text string such as a cursor left movement and text, this text is not appended but inserted right before the last character because of the cursor left movement. The method 200 interprets these vt100 escape sequences in the received output. For example, if "Test-Pro^Empt" is sent to the service 120, there is a possibility that "Test-Pro\b\b\b\b\b\bTest-Prompt" is received such that backspaces are added to erase what is already there, and then new text is sent. It is also possible that "Test-Pro\r\x1b[KTest-Prompt" is received. The "\r" is a carriage return that instructs the terminal to move the cursor back to the start of the line, then "\x1b[K" to erase everything after the cursor position, then rendering again. Other variations are within the scope of various example embodiments. With this editing probe, it is also possible that the "Test-Prompt" is output without any escape sequences being introduced. As a result, line editing commands are provided to a remote network device, and if the line editing functionality is available at the remote network device, it should interpret these commands, and render the corresponding output back to the "terminal", which is the service 120 that includes a terminal emulator configured to interpret line editing functionality regardless of the line editing library of the remote network device.

Figure 3:
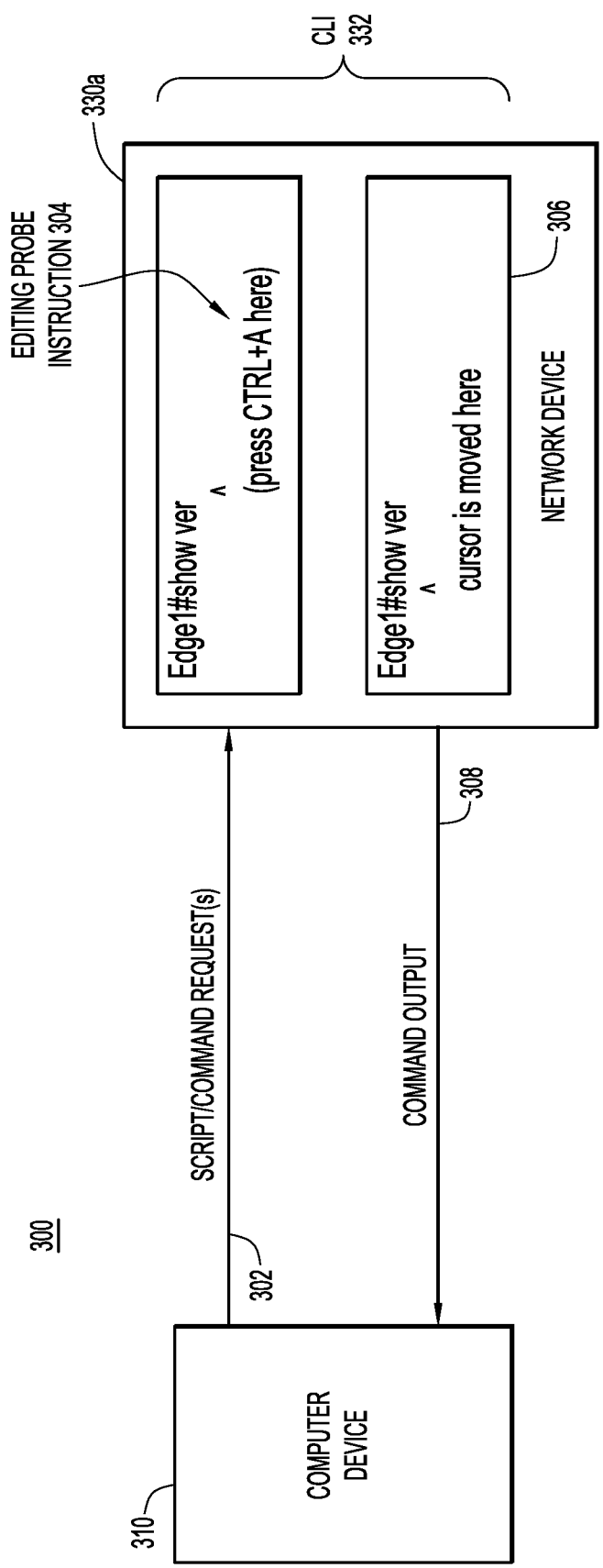
FIG. 3 is a block diagram illustrating a system for detecting command output completion on a command line interface of a network device, according to another example embodiment.

FIG. 3 is a block diagram illustrating a system 300 for detecting command output completion on a CLI 332 for interfacing with a network device 330a, according to another example embodiment. The system 300 includes a computer device 310, such as the console 110 of FIG. 1, and a network device 330a such as one of the network devices 130a-n of FIG. 1. The computer device 310 communicates with the network device 330a via one or more networks by establishing an SSH connection. The CLI 332 is provided for interfacing with the network device 330a.

The computer device 310 provides, via the established SSH connection, to the network device 330a, one or more of command requests 302. These command requests 302 may be in a form of a script that is to be executed (e.g., one-by-one) by the network device 330a, for example.

The computer device 310 may transmit an editing probe instruction 304 to the network device 330a to detect command output completeness. For example, a test string "$prompttest$" or "show ver" is input and is then followed by a "Control-A" key press to move the cursor to the beginning of the input prompt "Edge1 #". Next, "Control-K" key press may be input (not shown) to delete everything after the cursor.

These line-editing instructions (the editing probe instruction 304), however, are only interpreted if the input prompt "Edge1 #" receives them. In this case, the edit probe instruction 304 is transformed into one or more cursor movements 306 at the CLI 332. Also, one or more of cursor movements 306 are captured in the command output 308 as test strings. These test strings may include backspaces, spaces, and/or "VT 100 escape sequences". For example, a command "CTRL+A" is typically printed as "^A" in the command output 308.

The command output 308 that captured one or more of the cursor movements 306 is provided to the computer device 310 for processing. The computer device 310 analyzes the command output 308 to detect one or more of the test strings therein and erases the detected strings from the command output 308. The computer device 310 determines completeness of the command output 308 based on detecting one or more of these test strings.

On the other hand, if the editing probe instruction 304 is provided while one of the command requests 302 is still being executed (a command output 308 is actively output), the following may occur depending on a particular configuration of the network device 330a: (1) the editing probe instruction 304 is printed to a standard output (echoed in an "stdout"—the command output 308), (2) the editing probe instruction 304 is suppressed or ignored and is deleted from an input buffer (not shown) of the network device 330a before the prompt "Edge1 #" appears (nothing happens), or (3) if the network device 330a supports a type-ahead-feature, then (a) the editing probe instruction 304 remains in the input buffer until the line-editing functionality is enabled and (b) the editing probe instruction 304 is then input from the input buffer and is processed. Accordingly, if the command output 308 includes the editing probe instruction 304 itself and/or the cursor movement is not detect, then the command is still being processed and the command output is being displayed and line-editing functionality is enabled, the keys for cursor movements result in cursor movements on the CLI 332, which are then rendered as predetermined codes (VT100 ANSI escape sequences) into the command output 308. On the other hand, if the operator provides these key bindings (editing probe instruction 304) while one or more of the command requests 302 is being processed, the network device 330a (located at a remote side) may just echo these keys in the command output 308. By detecting and analyzing the command output 308 (received in response to the editing probe instruction 304), a decision can be made whether a prompt is being displayed or whether more command output 308 is to follow.

Pseudo code of one example implementation is as follows:

```
import asyncio
import re
from contextlib import asynccontextmanager
from typing import Iterable
import asyncssh
options = asyncssh.SSHClientConnectionOptions(known_hosts=None)
async def main( ) -> None:
    """
    Example that runs the same command multiple times. Each time it should
    return the same output, if the code is working. The example uses a jumphost
    too.
    """
    async with asyncssh.connect(
        "10..........", username="..........", password="......", port=2222
    ) as tunnel:
        async with asyncssh.connect(
            "..........",
            username="........",
            password="......",
            port=22,
            tunnel=tunnel,
            options=options,
        ) as conn2:
            async with CommandRunner.create(conn2) as runner:
                text_1 = await runner.run_command("show version")
                text_2 = await runner.run_command("show version")
                text_3 = await runner.run_command("show version")
                print(repr(text_1))
                print(repr(text_2))
                print(repr(text_3))
                assert text_1 == text_2 == text_3
class CommandRunner:
    def __init__(self, process: asyncssh.SSHClientProcess) -> None:
        self.process = process
        self._counter: int = 0
        self._lock = asyncio.Lock( )
    @classmethod
    @asynccontextmanager
    async def create(
        cls, connection: asyncssh.SSHClientConnection
    ) -> Iterable["CommandRunner"]:
        async with connection.create_process( ) as process:
            runner = cls(process)
            # Wait for the first prompt.
            await runner.run_command("")
            yield runner
    async def run_command(self, command: str = "", chunk_size=1024) -> str:
        """
```

308 is incomplete. Since cursor movement keys only work if the network device 330a is prompting for input, these keys will be ignored or echoed back rather than processed when the network device 330a is processing a command and/or still in the process of rendering the command output 308.

According to one or more example embodiments, instead of detecting the prompt itself, presence of an active prompt is determined based on detecting readiness of the network device 330a to accept line-editing instructions. If the prompt In this example, each time, after receiving a portion of the command output 308 (a chunk of text), the editing probe instruction 304 is resent so that it is processed when the input prompt becomes available. As a result, no specific knowledge of the input prompt is required and the techniques are generic and apply to various systems with different input prompts. While it is possible that this editing probe instruction 304 is sent frequently, it is easily removed from the command output. That is, while the rendered escape sequences for the cursor movement may depend on the configuration of the network device 330a and the timing (whether it is rendered for every key stroke, or all at once), the output of editing probe instruction is easily detected as it includes backspace+spaces+backspace such as: ""\\r\\n\r\\n\\r\\ncsr1000v_1>$prompttest$\\x08\\x08\\x08\\x08\\x08\\x08\\x08\\x08\\x08\\x08\\x08 \\x08\\x08\\x08\\x08\\x08\\x08\\x08\\x08\\x08\\x08\\x08\\x08".

If no command is input, the computer device 310 reads the command output 308 until the prompt is detected and does not send any editing probe instruction 304. This is useful to skip over various irrelevant messages such as "message-of-the-day" welcome message when the connection is established.

According to one or more example embodiments, the same editing probe instructions and/or different editing probe instructions are generated to detect whether the line-editing functionality is present at a network device.

In one example implementation, new editing probe instructions are generated as follows:

In summary, the techniques presented herein provide a process for patternless prompt detection in traditional character based terminals (network devices). This allows reliable and performant detection of the command output completion, which is important for programmatic consumption of terminal sessions. High performance and universality of the techniques presented herein facilitate automation of network operations and troubleshooting at high scale. For example, downloading 1000 command outputs using the techniques presented above may take approximately one second while the same performed with existing solutions may take approximately 100 seconds.

Figure 4:
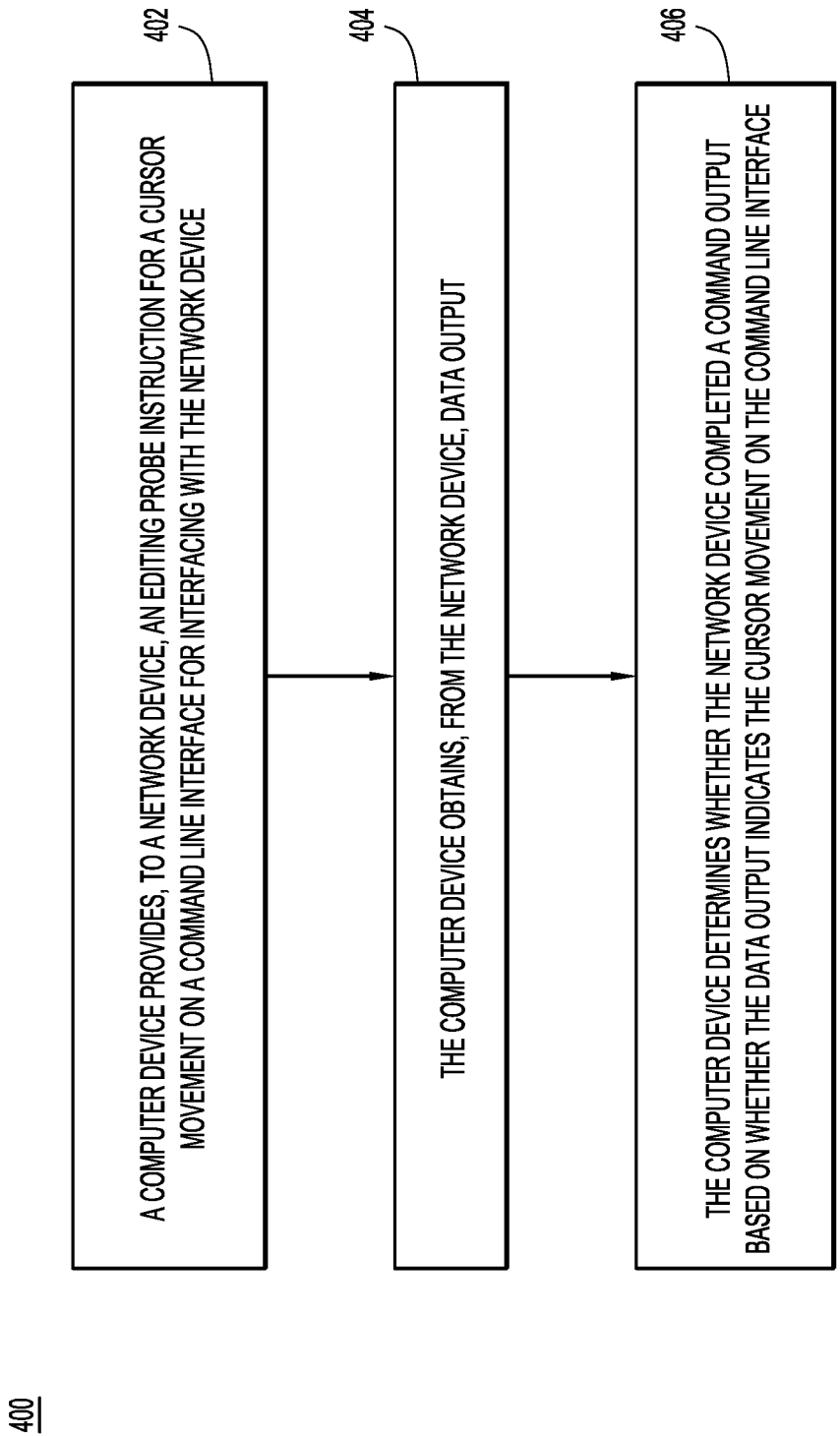
FIG. 4 is a flow diagram illustrating a method for determining whether the network device completed command output based on whether the data output indicates that the cursor movement on the command line interface occurred, according to an example embodiment.

Reference is now made to FIG. 4, with continued reference to FIG. 1. FIG. 4 is a flow diagram illustrating a method 400 of detecting an active command input prompt, according to an example embodiment. The method 400 may be implemented by a computer device such as the console 110 of FIG. 1 and/or the computer device 310 of FIG. 3.

At 402, the method 400 involves a computer device providing, to a network device, an editing probe instruction for a cursor movement on a command line interface for interfacing with the network device.

```
""
        # Create new test string. Every time a different test string is generated in
        # case test strings leak between commands (need not truncate too early).
        self.__counter += 1
        counter = self.__counter
        test_string = f"$prompttest-{counter}$\x01\x0b"
        writer = self.process.stdin
        reader = self.process.stdout
        async with self.__lock:
            # If a command has to be executed. Send to server.
            if command:
                writer.write(command)
                writer.write("\n")
                await writer.drain( )
            # Loop until we have received all data.
            received_text = ""
            while True:
                received_text += await reader.read(chunk_size)
                if f"$prompttest-{counter}$\x08" in received_text:
# Note: at this point, it could be that more backspaces are following (especially with very
# small chunk sizes, such as one line, it is likely to happen) but not yet part of this chunk. # We break out of the loop anyway, and handle the leading backspaces at the start of next
# command.
                    break
# Send test string for checking whether basic line editing is already available.
            writer.write(test_string)
            await writer.drain( )
# Clean up output.
# Remove literal test strings that ended up in the output.
        received_text = received_text.replace(test_string, "")
# Remove everything now after the first working $prompttest$.
        received_text = re.sub(
            re.escape(f"$prompttest-{counter}$") + ".*$", "", received_text
        )
# Process backspaces.
        characters = [ ]
        for c in received_text:
            if c == "\x08":
                if characters:
                    characters.pop( )
            else:
                characters.append(c)
        received_text = "".join(characters)
        return received_text
if __name__ == "__main__":
    asyncio.get_event_loop( ).run_until_complete(main( ))
```

At 404, the method 400 involves the computer device obtaining, from the network device, data output.

At 406, the method 400 involves the computer device determining whether the network device completed a command output based on whether the data output indicates the cursor movement on the command line interface.

In the method 400, the operation 406 of determining whether the network device completed the command output may include analyzing the data output to detect whether the network device executed the editing probe instruction and determining that the network device completed the command output based on detecting that the network device executed the editing probe instruction.

In one form, the operation 406 of determining whether the network device completed the command output may further include the computer device obtaining from the network device, next data output based on detecting that the network device did not execute the editing probe instruction.

In another form, the method 400 may involve the computer device providing, to the network device, a command to be executed by the network device to produce the command output. In this case, the operation 404 of obtaining the data output may include obtaining at least a portion of the command output in response to the command being executed by the network device.

In the method 400, the editing probe instruction may be provided after the command. The method 400 may further involve the computer device providing, to the network device, a next editing probe instruction based on reaching a predetermined probe timeout prior to obtaining the data output.

According to one or more example embodiments, the method 400 may further involve analyzing the data output to detect that the network device executed the next editing probe instruction and determining that the network device completed the command output based on detecting that the network device executed the next editing probe instruction.

In one instance, the operation of analyzing the data output may include detecting a data sequence in the data output indicating that the network device executed the next editing probe instruction. The method 400 may further involve deleting the data sequence from the data output.

In the method 400, the computer device may be a client device and the network device may be a character-based terminal. The command line interface may be configured to provide a prompt for inputting a command and to provide the command output in response to an execution of the command by the network device. The method 400 may further involve the computer device establishing a connection with the network device and providing, to the network device, a script comprising a plurality of commands to be input at the prompt of the command line interface for execution by the network device.

FIG. 5 is a hardware block diagram of a computing device 500 that may perform functions associated with any combination of operations in connection with the techniques depicted in FIGS. 1-4, according to various example embodiments, including, but not limited to, operations of the console 110, the service 120 of FIG. 1, or the computer device 310 of FIG. 3. Further, the computing device 500 may be representative of one of the network devices 130a-n of FIG. 1 or the network device 330a of FIG. 3. It should be appreciated that FIG. 5 provides only an illustration of one embodiment and does not imply any limitations with regard to the environments in which different embodiments may be implemented. Many modifications to the depicted environment may be made.

In at least one embodiment, computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with one or more memory elements 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computer device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 516, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided such as the console 110 of FIG. 1 or the computer device 310 of FIG. 3. The apparatus includes a memory, a network interface configured to enable network communications and a processor. The processor is configured to perform various operations. The operations include providing, to a network device, an editing probe instruction for a cursor movement on a command line interface for interfacing with the network device. The operations further include obtaining, from the network device, data output and determining whether the network device completed a command output based on whether the data output indicates the cursor movement on the command line interface.

In one form, the processor may be configured to perform the operation of determining whether the network device completed the command output by analyzing the data output to detect whether the network device executed the editing probe instruction and by determining that the network device completed the command output based on detecting that the network device executed the editing probe instruction.

According to one or more example embodiments, the processor may further be configured to perform the operation of determining whether the network device completed the command output by obtaining, from the network device, next data output based on detecting that the network device did not execute the editing probe instruction.

In another form, the processor may further be configured to perform an additional operation which involves providing, to the network device, a command to be executed by the network device to produce the command output. Additionally, the processor may be configured to obtain the data output by obtaining at least a portion of the command output in response to the command being executed by the network device.

According to one or more example embodiments, the editing probe instruction may be provided after the command. The processor may further be configured to perform another additional operation that involves providing, to the network device, a next editing probe instruction based on reaching a predetermined probe timeout prior to obtaining the data output.

In yet another form, the processor may be configured to perform a number of additional operations involving analyzing the data output to detect that the network device executed the next editing probe instruction and determining that the network device completed the command output based on detecting that the network device executed the next editing probe instruction.

In one instance, the processor may be configured to perform the operation of analyzing the data output by detecting a data sequence in the data output indicating that the network device executed the next editing probe instruction. The process may further be configured to perform a deleting operation in which the data sequence is deleted from the data output.

In yet another example embodiment, one or more non-transitory computer readable storage media encoded with instructions are provided. When the media is executed by a processor, the instructions cause the processor to execute a method involving providing, to a network device, an editing probe instruction for a cursor movement on a command line interface for interfacing with the network device and obtaining, from the network device, data output. The method further involves determining whether the network device completed a command output based on whether the data output indicates the cursor movement on the command line interface.

In one instance, the operation of determining whether the network device completed the command output may include analyzing the data output to detect whether the network device executed the editing probe instruction and determining that the network device completed the command output based on detecting that the network device executed the editing probe instruction.

According to one or more example embodiments, the operation of determining whether the network device completed the command output may include obtaining, from the network device, next data output based on detecting that the network device did not execute the editing probe instruction.

In one form, the method may further include providing, to the network device, a command to be executed by the network device to produce the command output. The operation of obtaining the data output may include obtaining at least a portion of the command output in response to the command being executed by the network device.

In another form, the editing probe instruction is provided after the command. The method may further include providing, to the network device, a next editing probe instruction based on reaching a predetermined probe timeout prior to obtaining the data output.

In yet another example embodiment, a system is provided that includes the devices and operations explained above with reference to FIGS. 1-5.

The programs described herein (e.g., control logic 520) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 506 and/or memory elements(s) 504 can store data, software, code, instructions (e.g., processor instructions), logic, parameters, combinations thereof, and/or the like used for operations described herein. This includes the storage 506 and/or memory elements(s) 504 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   providing, by a computer device to a network device, a probe instruction for a command line interface of the network device;
   obtaining, by the computer device from the network device, data output; and
   determining, by the computer device, whether the network device completed a command output based on whether the data output includes a data sequence indicative of the command line interface being enabled to receive a next probe instruction.

2. The method of claim 1, wherein determining whether the network device completed the command output includes:
   analyzing the data output to detect whether the network device executed the probe instruction; and
   determining that the network device completed the command output based on detecting that the network device executed the probe instruction.

3. The method of claim 2, wherein determining whether the network device completed the command output further includes:
   obtaining, by the computer device from the network device, next data output based on detecting that the network device did not execute the probe instruction.

4. The method of claim 2, wherein determining whether the network device completed the command output further includes:
   determining that the network device has not completed the command output based on the data output including the probe instruction and not the data sequence.

5. The method of claim 1, further comprising:
   deleting the data sequence from the data output.

6. The method of claim 1, wherein the computer device is a client device and the network device is a character-based terminal, and the command line interface is configured to provide a prompt for inputting a command and to provide the command output in response to an execution of the command by the network device.

7. The method of claim 6, further comprising:
   establishing, by the computer device, a connection with the network device; and
   providing, by the computer device to the network device, a script comprising a plurality of commands to be input at the prompt of the command line interface for execution by the network device.

8. The method of claim 7, wherein the probe instruction is included in the script after at least one of the plurality of commands.

9. The method of claim 1, further comprising:
   providing, by the computer device to the network device, the next probe instruction based on reaching a predetermined probe timeout prior to obtaining the data output.

10. An apparatus comprising:
    a memory;
    a network interface configured to enable network communications; and
    a processor, wherein the processor is configured to perform operations comprising:
       providing, to a network device, a probe instruction for a command line interface of the network device;
       obtaining, from the network device, data output; and
       determining whether the network device completed a command output based on whether the data output includes a data sequence indicative of the command line interface being enabled to receive a next probe instruction.

11. The apparatus of claim 10, wherein the processor is configured to perform the operation of determining whether the network device completed the command output by:
    analyzing the data output to detect whether the network device executed the probe instruction; and
    determining that the network device completed the command output based on detecting that the network device executed the probe instruction.

12. The apparatus of claim 11, wherein the processor is configured to perform the operation of determining whether the network device completed the command output by:
    obtaining, from the network device, next data output based on detecting that the network device did not execute the probe instruction.

13. The apparatus of claim 11, wherein the processor is configured to perform the operation of determining whether the network device completed the command output by:

determining that the network device has not completed the command output based on the data output including the probe instruction and not the data sequence.

14. The apparatus of claim 10, wherein the processor is further configured to perform:

deleting the data sequence from the data output.

15. The apparatus of claim 10, wherein the apparatus is a client device and the network device is a character-based terminal, and the command line interface is configured to provide a prompt for inputting a command and to provide the command output in response to an execution of the command by the network device.

16. The apparatus of claim 15, wherein the processor is further configured to perform operations including:

establishing a connection with the network device; and providing, to the network device, a script comprising a plurality of commands to be input at the prompt of the command line interface for execution by the network device.

17. One or more non-transitory computer readable storage media encoded with instructions that, when executed by a processor, cause the processor to execute a method comprising:

providing, to a network device, a probe instruction for a command line interface of the network device;

obtaining, from the network device, data output; and determining whether the network device completed a command output based on whether the data output includes a data sequence indicative of the command line interface being enabled to receive a next probe instruction.

18. The one or more non-transitory computer readable storage media of claim 17, wherein determining whether the network device completed the command output includes:

analyzing the data output to detect whether the network device executed the probe instruction; and determining that the network device completed the command output based on detecting that the network device executed the probe instruction.

19. The one or more non-transitory computer readable storage media of claim 18, wherein determining whether the network device completed the command output includes:

obtaining, from the network device, next data output based on detecting that the network device did not execute the probe instruction.

20. The one or more non-transitory computer readable storage media of claim 18, wherein determining whether the network device completed the command output includes:

determining that the network device has not completed the command output based on the data output including the probe instruction and not the data sequence.

* * * * *